Dec. 12, 1950     D. MARFIELD     2,533,383
HEAT DISTRIBUTING PLATE
Filed April 22, 1946            3 Sheets-Sheet 1
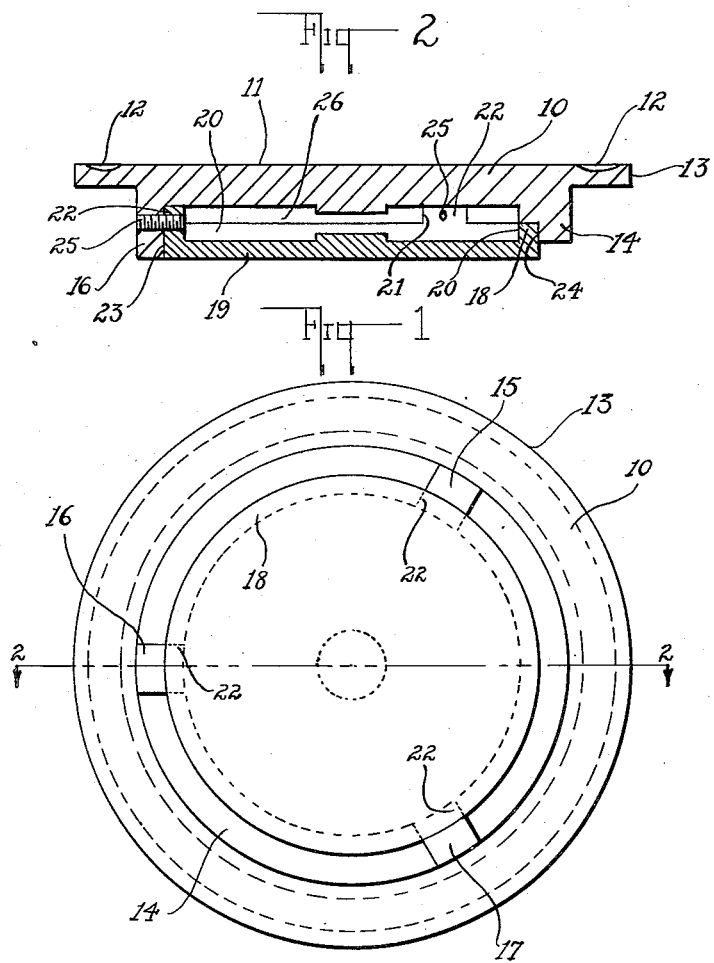
INVENTOR.
Dwight Marfield
BY
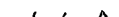
ATTORNEY Dec. 12, 1950  D. MARFIELD  2,533,383
HEAT DISTRIBUTING PLATE
Filed April 22, 1946  3 Sheets-Sheet 2
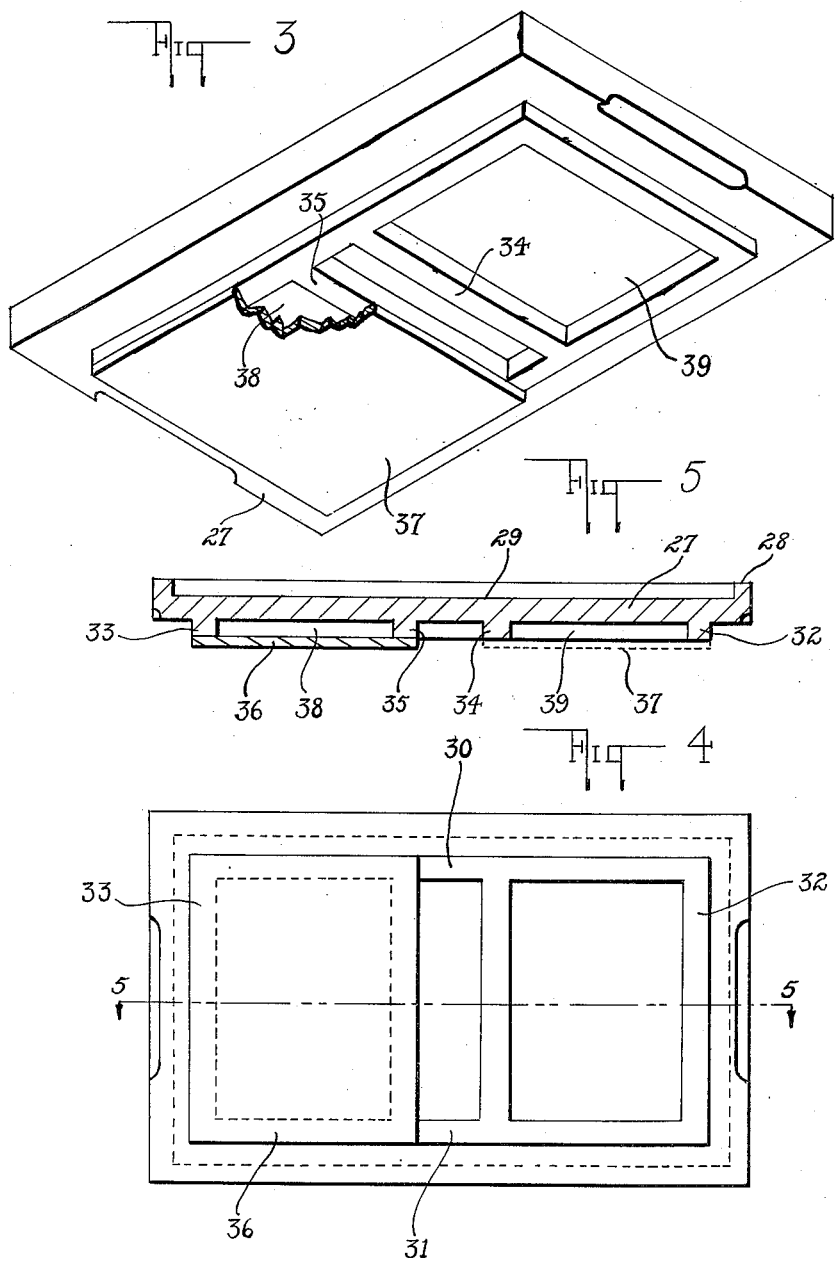
INVENTOR.
Dwight Marfield
BY
ATTORNEY Dec. 12, 1950 D. MARFIELD 2,533,383
HEAT DISTRIBUTING PLATE
Filed April 22, 1946 3 Sheets-Sheet 3
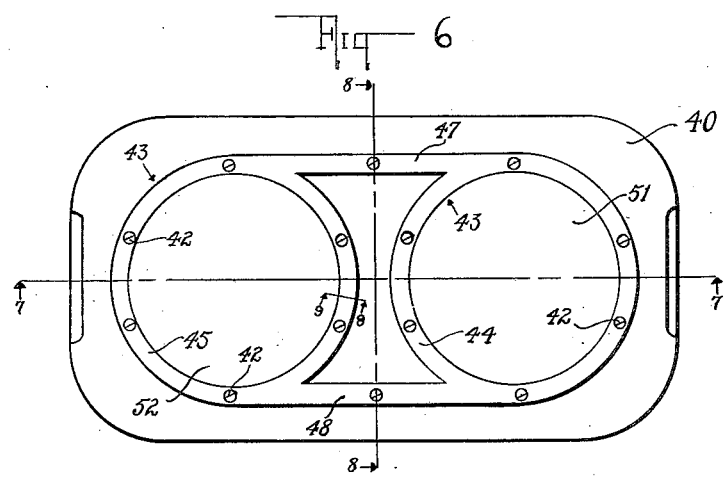
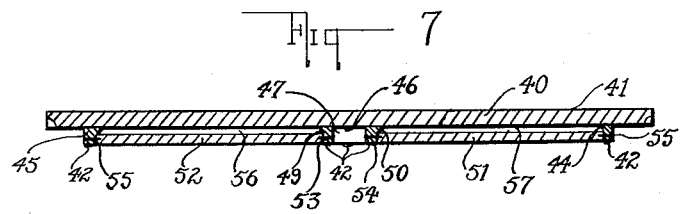
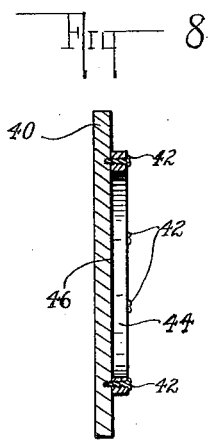
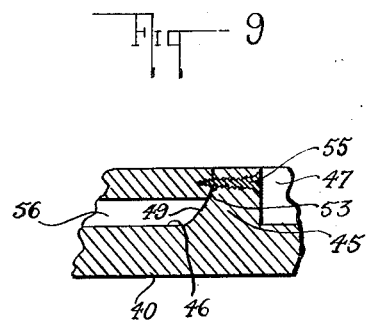
INVENTOR.
DWIGHT MARFIELD
BY
ATTORNEY Patented Dec. 12, 1950

2,533,383

UNITED STATES PATENT OFFICE 2,533,383

HEAT DISTRIBUTING PLATE

Dwight Marfield, Pasadena, Calif.

Application April 22, 1946, Serial No. 664,106

1 Claim. (Cl. 126—214)

My invention relates to a heat distributing plate employed in connection with a gas flame or electric heating element used for cooking, and has for its object to control the heat from a gas burner or electric element so that no intense hot spots develop and the burning of food is prevented.

As is well known, gas and also electric ranges are largely employed for cooking both in homes and in general use. The burners or heating elements at the top of the stove are generally circular and tend to concentrate the heat very much within the immediate circular area of the heater. The result is that in applying this heat to the under surface of a cooking utensil such as a frying pan, griddle and the like there is a tendency for a portion of the cooking utensil exposed directly to the heater to become very hot with the result that the food is not cooked uniformly, some of it being overcooked or burned and other portions not being sufficiently cooked. A well known example of this difficulty in cooking both at home and in restaurants is in the frying of bacon where frequently a strip of bacon will have a portion overcooked or burned and another portion which extended outwardly from the central hot regions which is hardly cooked at all.

I have discovered a very simple means of remedying this difficulty and of providing a uniform distribution of heat from the hot gas flame or the electric heating elements such that cooking will be effected uniformly over the entire surface of the cooking utensil without excessive and too rapid cooking in some spots and too slow cooking in other parts and without burning.

This is effected by means which so distributes the heat of the gas flame or of the electric heater that the surface of the cooking utensil is uniformly heated without regions of excessive heat and so that the cooking operation may be carried on over the entire surface of the cooking utensil uniformly for the whole material being cooked and so burning thereof will never take place.

My discovery in this particular embodies the use of a plate having a plane surface adapted to be used directly as a cooking surface or to receive thereon a cooking utensil, and of a second plate united therewith and overlying a gas flame or an electric heating element burner, which second plate receives directly the heat of the burner, with a dead air space between the heating elements and the outer surface of the first-named plate. The part of the second plate between the dead air space and the flame will, of course, become intensely heated. It will radiate some of its heat across the dead air space and will, of course, become very hot.

Most of the heat from the hot plate will, however, be distributed to the surface of the cooking plate by conduction from the metal of the hot plate through the metal support, which spaces it from the cooking plate, to the cooking plate itself, with the result that the cooking surface of the plate, whether used for direct cooking or to support a cooking utensil, will have its heat uniformly distributed through it to bring a constant and uniform cooking temperature with no excessive hot spots or cool regions.

I also discovered that, as a means of assisting the conduction of heat the connecting means between the two plates, which seals in the dead air space, may advantageously be ribs secured to the under side of the cooking plate by any means desired such as screws, direct casting with the plate, or other means.

I also discovered that it is advantageous to form the plate which directly overlies the gas flame or electric heating elements of a metal having a high coefficient of heat conductivity, as for example aluminum or alloys of aluminum, or copper and alloys of copper.

Further I have discovered that it is advantageous to form the plate which contacts the food to be cooked or the cooking containers containing the food to be cooked of similar material, which receives heat radiated through the dead air space from the hot plate and also the heat of conduction passing through the body of the metal forming the hot plate and the upper contacting plate of the entire arrangement and the metal connections between the two. Using metal of such high heat conductivity aids in distributing the heat by conduction from the gas flame or electric heating element so that it is transmitted rapidly and uniformly to all parts of the upper contacting surface and from there to the food thereon or to the cooking utensil rested thereon.

It is a principal object of my invention, therefore, to provide a composite plate to be rested upon and over the gas flame or electric heating element of a cooking range, said plate embodying a top contact portion and a bottom portion directly adjacent the gas flame or the electric heating element, with a dead air space between them, whereby the heat from the gas flame or from the electric heating element will be transmitted indirectly to the contact plate and so distributed thereto that it will be free from any excessive hot portions or from portions too cool to effect proper cooking, but in fact will be uniformly distributed to produce a uniform cooking heat at and over the entire surface of the contact plate.

It is a further object of my invention to provide such a plate wherein there will be a single top contact plate to overly a multiplicity of burners, either gas flame or electric heating elements, with a single conduction surface, and wherein there will be a single plate to be rested upon and subject to the direct heat of each of the burners, each of said plates being separated by a dead air space from the conductive top plate.

It is a further object of my invention to form the food or cooking utensil contacting member as a single plate with a smooth plane top surface adapted to be used to cook directly upon the surface or to receive utensils of considerable size, and to form this plate to overly a plurality of burners, either two or four, as might be desired, and to secure on the underside of the plate a heat contacting plate directly above the burners, said plate being spaced from the cooking plate and being sealed to leave a dead-air space, there being one of said plates for each burner.

It is a further object of my invention to form the top plate and particularly the upper surface thereof to receive the food to be cooked directly as for example to provide a cooking surface equivalent to a griddle for cakes, waffles and the like or to a frying pan for eggs, bacon, ham, steak and the like.

The full objects and advantages of my invention will appear in connection with the detailed description thereof which is given in the following specification and the novel features of my invention and discovery by which the aforesaid important and advantageous results are obtained will be particularly pointed out in the claim.

In the drawings illustrating applications of my invention in some of its forms:

Fig. 1 is a bottom plan view of my invention applicable to a single cooking burner.

Fig. 2 is a sectional view taken on line 2—2 of Fig. 1.

Fig. 3 is a perspective view of a heat distributing plate viewed from the under side, which is adapted to cover a plurality of burners, specifically two.

Fig. 4 is a plan view of the heat distributor shown in Fig. 3 with one heat-exposed plate withdrawn.

Fig. 5 is a sectional view taken on line 5—5 of Fig. 4.

Fig. 6 is a bottom plan view of another form of the invention.

Fig. 7 is a longitudinal sectional view taken on line 7—7 of Fig. 6.

Fig. 8 is a transverse sectional view taken on line 8—8 of Fig. 6.

Fig. 9 is a part sectional view taken on line 9—9 of Fig. 6 showing the manner of fastening central heat plates in airtight relation to the flanges, and the flanges cast integral with the plates.

Referring to Figs. 1 and 2, a plate 10 is provided which may be formed of any suitable metal, preferably a metal which has good heat conductivity. The plate 10 is circular as shown in Fig. 1 and is provided with a flat surface 11 and a circular depressed annular groove 12. The surface 11 may be used directly as a cooking surface or it may be employed as a contact support for a cooking utensil.

Spaced from the outer circular edge 13 of the plate 10 is an annular flange 14 provided with a series of outwardly extending lugs 15, 16, and 17. Inwardly extending from the flange 14 is an annular ledge 18 shown in dotted lines in Fig. 1.

A second plate 19, circular in cross-section, is formed of metal having a very high coefficient of heat conductivity such as aluminum or aluminum alloys or copper or copper alloys. The plate 19 is circular and is provided with an annular flange 20 which rests upon the ledge 18. The ledge 18 is formed with cut out portions 21 which receive lugs 22 positioned inside of and directly adjacent lugs 15, 16 and 17 on the flange 14. The lugs 22 are set in the sockets 21 as shown in Fig. 2. The outer circular surface 23 of the plate 19 and its flange 20 and the inner circular surface 24 of the flange 14 are finished smooth, are concentric and engage each other with a close fit, or a unitary flange structure may be cast as an integral part of plate 40, Fig. 7, and be united with circular plates 51 and 52 by means of screws or metal pins driven laterally and radially through the flanges and into the plates themselves.

Screw bolts 25 go through the lugs 15, 16 and 17 on the flange 14 and through the lugs 22 on the flange 20 of the plate 19, thus holding the parts together and producing between these parts a sealed dead-air chamber 26. It is this dead air chamber between the plates 10 and 19 which produces the remarkable results of my invention.

In use the form of the invention of Fig. 2 is applied over the customary burner of a gas or electric range. The heat of plate 19 is transmitted by radiation across the chamber 26 to the plate 10 and by conduction through the contacting flanges 14 and 20 to the outer portions of the plate 10. The result is a substantially equal distribution of heat throughout the plate 10 and to the surface thereof, without any formation of hot and cooler areas on the plate, which are the cause of so much overcooking and undercooking of foods with a cooking utensil directly exposed to the hot areas of the burner.

In substance the form of my invention shown in Figs. 3, 4 and 5 produces the same results.

Here the contacting plate 27 is formed with a top flange 28 and a cooking surface 29. The lower part of the plate is formed with side flat-topped flanges 30 and 31 and flanges 32 and 33, together with transverse flanges 34 and 35. Heat plates 36 and 37 (the latter shown in dotted line) are secured to the top of the several sets of flanges. When so secured there will be formed dead air spaces 38 and 39.

The arrangement is such that this plate may be set over two burners either on an electric range or a gas range and the heat from the two burners will be distributed over the entire surface 29 of the plate proper. This arrangement makes a most excellent surface for cooking eggs, griddle cakes, waffles, bacon and the like. In this form of the invention it is not intended that any cooking utensil should be placed upon the surface 29, but the entire operation is carried on upon the surface 29 itself as a cooking surface. The distribution of heat from the hot areas directly below the dead air spaces 38 and 39 will be uniform through the plate 27, this distribution taking place both by radiation across the dead air spaces 38 and 39 and by conduction through the various flange arrangements 30—31, 32—33, and 34—35.

In the form of my invention of Figs. 6 to 9, a flat plate 40, preferably with a complete flat surface 41 is provided of good heat conducting metal. There may be a rim about the edge of this plate for use of it for direct surface cooking, but for receiving large vessels it is better to be rimless.

On the back of the plate 40 is secured, by means of screws 42 threaded into the body of plate 40, a flange member 4. The flange member 43 comprises two circular flange bodies 44 and 45 preferably pyramidal in shape and with the bases of the pyramids true and smooth, to make a completely sealing contact with the bottom surface 46 of the plate 40. The circular flange members 44 and 45 are connected by flange bars 47 and 48 making the entire flange member a unitary structure.

As shown in Fig. 9, the flange members 44, 45, 47 and 48 will, under certain conditions, preferably be cast integral with the plate member 40, thus not only of the same metal, but formed as a part of the same identical casting. This form is identically the same as that shown in Figs. 6 and 7, excepting that the flange members are an integral part of the casting forming the plate 40.

The inner walls of circular flanges 44 and 45 are sloping, as indicated at 49 and 50. Circular plates 51 and 52 are provided with corresponding sloping edge walls 53 and 54. These plates have their respective sloping edges in sealing contact with the sloping edges 49 and 50 of the circular flanges 44 and 45 and are held in position by screws 55 carried laterally through the flange bodies 44 and 45 and into the circular plates 51 and 52, Fig. 9. There is thus formed below the plates 51 and 52 and plate 40 sealed air chambers 56 and 57 which are airtight and come above the inner surfaces of the circular plates 51 and 52.

The plates 51 and 52 are the hot plates immediately above a pair of burners. The heat from the burners is transferred to the plate 40 and its surface 41 by radiation through the spaces 55 and 57 from the highly heated circular plates 51 and 52 and by conduction from the edges of said plates through the flanges 44, 45, 47 and 48. By this means the heat of the burners is uniformly distributed to the contact surface 41 of plate 40 without formation of any intensely heated parts, and in fact with a uniform heat through the whole of surface 41.

In this form of the invention the top surface 41 of plate 40 may be free of any raised or indented portions and is particularly adapted to receive upon it cooking utensils of large size such as types of roasters, washing machines, boiler pans and the like, where it is desirable to subject a larger surface of the heating medium to the heat from the burner than can be done with a single small burner.

An important feature of the invention resides in the dead air space enclosed by the flange between the upper and lower plates. Since the surfaces of the members which are joined to one another are carefully machined, their coaction is to provide a sealed substantially airtight enclosure containing a body of gas situated between the two plate members directly over the source of heat. As heat is transmitted through the metal to the gas, its temperature increases causing a corresponding increase of the pressure of the gas within the enclosure. As will be well understood from the study of the gas laws, the temperature of a body of enclosed gas maintains a substantially uniform pressure throughout the body of gas and a change in temperature will cause a corresponding change in pressure. Although there will be a constant inflow and outflow of heat with respect to the several members, the body of enclosed gas will at any instant always have a uniform temperature throughout and will, therefore, tend to maintain a substantially uniform temperature which in turn will tend to maintain a uniform temperature throughout the area of the upper plate situated over the dead air space. Since the dead air space extends beyond the direct vertical limits of the source of heat and also extends to an area representing the major portion of the upper plate, the area of the upper plate over the dead air space will, therefore, be at all times maintained at a substantially uniform temperature throughout regardless of the fact that heat is travelling through the metal members.

The advantages of my invention will be quite clearly understood from the foregoing description. The fundamental advantage, whether the heat distributing means is used as a direct cooking member or as a support for cooking or other heat-receiving utensils, is found in the fact that the distribution of heat from the burners goes at a uniform degree to all parts of the surface of the heat distributor without formation of either overheated regions or underheated regions, so cooking, in any of its forms upon and by the use of this heat distributor, is carried out uniformly with neither overcooking nor undercooking.

I claim:

A heat equalizing member for use in cooking food, comprising a flat lower plate whose opposite horizontal faces are parallel with each other throughout a defined heat transfer area, said plate being of such dimensions as to extend beyond the direct vertical boundary of a source of cooking heat, a flat upper plate whose opposite horizontal faces are parallel with each other, said upper plate being of dimensions to extend substantially beyond the boundaries of the lower plate, said upper plate overlying the lower plate and being separated from the lower plate to form an unobstructed air space over the source of heat, a continuous flange extending between the under surface of the upper plate at an area spaced inwardly from the periphery of said plate and surrounding the outer edge of the lower plate to form a lateral boundary for the air space, and fastening means passing transversely between the flange and the outer edge of the lower plate, the lower inner surface of the flange being recessed and surrounding the outer limits of the lower plate and the outer edge of the lower plate being shaped to cooperate with the recess in the flange to form an air-tight lap joint between the flange and the lower plate to seal the air within the air space whereby heat transferred from the lower plate to the upper plate occurs principally through the flange and the sealed air space maintains a substantially uniform temperature throughout the upper surface of the upper plate.

DWIGHT MARFIELD.

(References on following page)

REFERENCES CITED

The following references are of record in the file of this patent:

UNITED STATES PATENTS

| Number | Name | Date |
|---|---|---|
| 443,518 | Hain | Dec. 30, 1890 |
| 483,932 | Little | Oct. 4, 1892 |
| 658,491 | Sibbett | Sept. 25, 1900 |
| 852,116 | Herrick | Apr. 30, 1907 |
| 1,103,565 | Cloud | July 14, 1914 |
| 1,308,151 | Vogel | July 1, 1919 |
| 1,436,318 | Linn | Nov. 21, 1922 |
| 1,717,450 | Hostettler | June 18, 1929 |
| 1,961,643 | Roth | June 5, 1934 |
| 2,400,508 | Hermann | May 21, 1946 |

FOREIGN PATENTS

| Number | Country | Date |
|---|---|---|
| 401,457 | Great Britain | Nov. 16, 1933 |